United States Patent [19]
Krinninger et al.

[11] 3,796,876
[45] Mar. 12, 1974

[54] DEVICE FOR NON DESTRUCTIVELY AND SEPARATELY DETERMINING CONCENTRATIONS OF FISSIONABLE MATERIAL IN A TEST SPECIMEN

[75] Inventors: Herbert Krinninger, Bensberg, Cologne; Siegfried Wiesner, Dusseldorf/Heerdt, both of Germany

[73] Assignee: Interatom, Internationale Atomreaktorbau GmbH, Bensberg/Cologne, Germany

[22] Filed: Jan. 10, 1972

[21] Appl. No.: 216,855

Related U.S. Application Data
[63] Continuation of Ser. No. 18,462, March 11, 1970, abandoned.

[30] Foreign Application Priority Data
Mar. 14, 1969 Germany.............................. 1912982

[52] U.S. Cl................. 250/363, 250/83.1, 250/366
[51] Int. Cl........................... G01t 1/20, G01t 3/00
[58] Field of Search...................... 250/83.1, 71.5 A

[56] References Cited
UNITED STATES PATENTS
3,222,521  12/1965  Einfeld............................. 250/83.1
3,456,113  7/1969  Keepin.............................. 250/83.1

OTHER PUBLICATIONS
Price, Nuclear Radiation Detection, 1958, pp. 299-301.

Primary Examiner—James W. Lawrence
Assistant Examiner—Davis L. Willis
Attorney, Agent, or Firm—Herbert L. Lerner

[57] ABSTRACT

Device for non-destructively and separately determining concentrations of fissionable material in a test specimen includes a heavy moderator formed of lead having a given slowing-down time and having means for receiving a test specimen therein, means for irradiating the test specimen with neutrons so as to effect nuclear fissions producing prompt fission neutrons therein and for producing in the moderator a pulse of monoenergetic fast neutrons of short duration compared to the given slowing-down time of the moderator, and detector means including at least one recoil proton counter for determining, over various time intervals, in accordance with different mean energies of the irradiating neutrons being slowed-down in the moderator, the number of prompt fission neutrons produced in the test specimen.

10 Claims, 4 Drawing Figures

DEVICE FOR NON DESTRUCTIVELY AND SEPARATELY DETERMINING CONCENTRATIONS OF FISSIONABLE MATERIAL IN A TEST SPECIMEN

This is a continuation of application Ser. No. 18,462, filed Mar. 11, 1970 and now abandoned.

Our invention relates to device for non-destructively and separately determining concentrations of fissionable material in a test specimen and more particularly, to such device which non-destructively and separately determines concentrations of fissionable material in a test specimen such as a fuel rod or a fuel element of a nuclear reactor, for example. Such device includes a heavy moderator having means for receiving a test specimen therein, means for irradiating the test specimen with neutrons so as to effect nuclear fissions producing prompt fission neutrons therein and for producing in the moderator a pulse of monoenergetic fast neutrons of short duration compared to the given moderating or slowing-down time of the moderator, and detector means for determining over various time intervals, according to different mean energies of the irradiating neutrons being slowed-down in the moderator, the number of prompt fission neutrons produced in the test specimen due to nuclear fissions resulting from irradiation by the neutron irradiating means.

U.S. Pat. No. 3,222,521, Canadian Pat. No. 666,943 and German Published Application Ser. No. 1,275,794 describe a method of non-destructive analysis of fissionable material content, especially in nuclear reactor fuel elements, operating on the foregoing principle. They propose a heavy moderator wherein the neutrons lose relatively little energy for each collision. For such a heavy moderator the energy of the neutrons reduces with the lapse of time, the slowing-down or moderating time being proportional to $1/\sqrt{E}$, where E is the mean neutron energy in the moderating or slowing-down spectrum. After slowing-down times or periods corresponding to energies of 0.3eV and 0.025eV, the counting rates, proportional to the total fission rates in the fuel, of the prompt neutrons that are released at these neutron energies due to fission of U235 and Pu239, are measured. Since the components of the fissions in U235 and Pu239 are independent of the total fission rate due to the sharply different fission cross sections and vary to a different extent with the neutron energy, the unknown concentrations of the desired or sought after fissionable material in the test specimen are able to be calculated from these counting rates and from the counting rates that are measured at a reference member or specimen with the known concentrations of the desired fissionable material.

It is an object of our invention, accordingly, to provide device for non-destructively and separately determining concentrations of fissionable fuel in a test specimen which is a marked improvement over the heretofore known devices of this general type. More specifically, it is our object to provide such a device which permits achieving an optimum measurement accuracy.

It is another object of our invention to provide such device with a moderator having relatively good nuclear characteristics such as, for example, a low absorption cross section, affords a relatively long moderating or slowing-down time so that the energy regions wherein the measurement of the counting rates occurs can be accurately and reproducibly determinable with the electronic devices that are at hand, and can be produced rather economically with the required quality and purity. It is further an object of our invention to provide such device wherein a detector for determining the prompt fission neutrons is selected which delivers an optimum intelligence signal with respect to background.

With the foregoing and other objects in view we provide in accordance with our invention device for non-destructively and separately determining concentrations of fissionable material in a test specimen such as a fuel rod or a fuel element of a nuclear reactor comprising a heavy moderator formed of lead having a given slowing-down time and having means for receiving a test specimen therein, means for irradiating the test specimen with neutrons so as to effect nuclear fissions producing prompt fission neutrons therein and for producing in the moderator a pulse of monoenergetic fast neutrons of short duration compared to the given slowing-down time of the moderator, and detector means comprising at least one recoil proton counter for determining, over various time intervals, in accordance with different mean energies of the irradiating neutrons being slowed-down in the moderator, the number of prompt fission neutrons produced in the test specimen. A plastic scintillator is preferably employed as the recoil proton counter.

It has been found that a device of the aforementioned type having lead as moderator affords optimum results. Devices wherein a pulse of monoenergetic fast neutrons is produced in a lead moderator and is slowed-down therein, are known per se as "lead spectrometers." Our invention is nevertheless based on the realization that such a lead spectrometer is especially suited in the situation at hand out of the large number of devices, that are otherwise available, for producing the desired energy spectra of the neutrons. In a similar manner, a plastic scintillator has been found especially to be an optimum detector for the purpose at hand. It is of decisive importance for this selection of detector that for the greatest possible probability of detection of fast neutrons (fission neutrons), the detector should, on the other hand, be insensitive to the thermal and epithermal neutron flux simultaneously present and effecting the fissions. Also, irradiated fuel elements should be able to be inspected as to their content of fissionable material, which requires a gamma-insensitivity of the detector to relatively high dose outputs.

In accordance with a further feature of the invention, the detector is shielded by a layer of lead from the high gamma radiation of an irradiated test specimen.

This layer of lead is so selected that for a gamma irradiation at the surface of a test specimen, for example, an irradiated fuel element, the gamma activity at the location of the detector is actually diminished to the maximum permissible value. This also causes a given reduction in the flux of fast neutrons. It has been found that under these conditions a special plastic scintillator of the Skarsvag type, which is doped with small amounts of ZnS(Ag), in comparison to other types of detectors affords a maximum fission neutron counting rate.

In accordance with an added feature of our invention, we provide as moderator a square shaped, cubic or cylindrical lead block which is formed with two channels intersecting substantially in the center of the lead block, one of the channels being adapted to receive a test specimen therein and the other of the channels being adapted to receive a neutron source therein which is insertable up to the vicinity of the point of intersection of the channels. In accordance with yet another feature of the invention, a plurality of additional measuring channels is disposed perpendicularly to the first mentioned channel along the test specimen and are adapted to receive therein at least one detector respectively.

In accordance with a concomitant feature of the invention we provide a device wherein each scintillator measuring head is operated on one counting channel, each counting channel contains an integral discriminator for discriminating pulses that were produced by fast neutrons and by such pulses that were produced by gamma quanta and, furthermore, in each counting channel a time-controlled gate stage is provided, and the gate stages at different time intervals and periods, release, in accordance with the respective pulse of monoenergetic fast neutrons, the pulse travel to a respective counter.

The number of counted pulses depends upon the neutron flux which in its entirety had an effect upon the test specimen which causes the nuclear fissions to produce the fast neutrons that are to be counted. In order therefore to achieve comparable measurement results for the measurement at various test and reference specimens or members, in accordance with a further feature of our invention, we provide the device with at least one preselection counter, which closes when a predetermined pulse count is attained, on the monitor measuring channel, responsive to the entire neutron flux of the neutron source and formed of the detector system and one of the gate stages.

Other features which are considered as characteristic for the invention are set forth in the appended claims.

Although the invention is illustrated and described herein as embodied in device for non-destructively and separately determining concentrations of fissionable material in a test specimen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
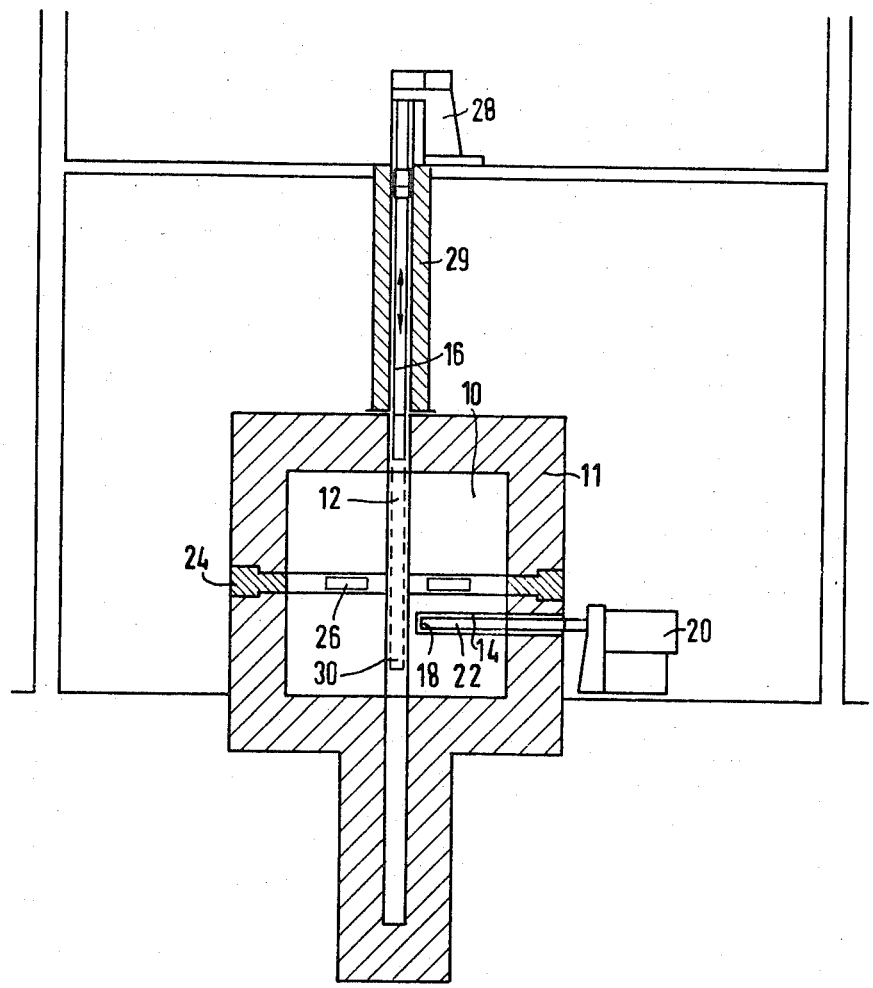
FIG. 1 is a schematic view partly in section of apparatus for measuring the uranium and plutonium contact of reactor fuel elements in combination with a device according to our invention.

Referring now to the drawings and first particularly to FIG. 1 thereof, there is shown the device of our invention which includes a lead block 10 as moderator. The block 10 is surrounded by shielding 11, for example of concrete or solid wood. A first channel 12 extending vertically and a second channel 14 extending horizontally, both as viewed in FIG. 1, are formed in the lead block 10. The channel 12 serves for receiving therein a test specimen 16, for example, a reactor fuel element. A target 18 of a neutron generator 20 serves as a source of neutrons and is inserted by means of a beam tube 22 into the channel 14. The neutrons are produced in a deuterium-tritium nuclear reaction. The target 18 contains tritium, and a supply of accelerating deuterium ions is fired onto the target 18. The deuterium ions are produced in a high frequency source and are accelerated by a pulsed focusing and accelerating system onto the target 18 so that a pulse of monoenergetic neutrons with an energy of 14 MeV (neutron generator 20) is produced in the center of the lead block 10.

In the horizontal central plane of the lead block 10, i.e. at the location of the maximum neutron flux, several measuring channels 24 are disposed. The measuring channels are armed with detectors 26 which surround the test specimen 16 in the shape of a star after the test specimen has been inserted into the measuring position 30.

If non-irradiated test irradiated specimens 16 are inspected as to the concentration of fissionable material therein, then for reasons of geometry the detectors are disposed directly around the test specimens 16. If irradiated test specimens 16 are to be analyzed, the detectors 26 are then shielded by a layer of lead of suitable thickness against gamma radiation.

The good geometrical resolving power of the measuring apparatus permits the determination of the axial distribution of the concentration of the fissionable material (burn-up analysis), two methods being possible:

a. stepwise measurement of the test specimen 16 by sliding the test specimen stepwise past the detectors 26 by means of a suitable conventional drive mechanism 28, the test specimen 16 located between drive mechanism 28 and the lead block 10 being in this case surrounded by shielding 29; and b. inserting the test specimen 16 into the lead block 10 and disposing the detectors 26 in a plurality of planes disposed perpendicularly to the axis of the test specimen 16.

The detectors 26 in the measuring channels 24 of a plane are connected to one another. Both methods permit the determination, on the one hand, of the entire content of U235 and Pu239 in the test specimen 16 (fuel element) and, on the other hand, the concentration distribution of the fissionable material along the axis of the test specimen 16.

The monoenergetic fast neutrons emanating from the neutron source 18 lose energy down to the thermal energy thereof in the course of time due to elastic collision thereof with lead atoms. Due to this neutron flux, nuclear fissions are produced in the test specimen 16. These nuclear fissions produce prompt neutrons which are indicated by the plastic scintillators 26 in the measuring channels 24. The number of these fission processes per unit time and therewith the detector counting rates are a function of the energy of the neutrons releasing the fission processes and are therewith dependent upon the time which has elapsed in accordance with given pulses of monoenergetic neutrons.

Since the fission cross sections of U235 and Pu239 depend in a different manner upon the energy of the neutrons, the time-dependent course of the counting rates is also determined by the concentrations of U235 and Pu239 in the test specimen. If the counting rates of the plastic scintillators are measured in two different energy regions, i.e., in the device of the instant application in two different time intervals, the content of U235 and Pu239 can be determined therefrom and from a corresponding measurement of a reference specimen of known concentration.

Figure 2:
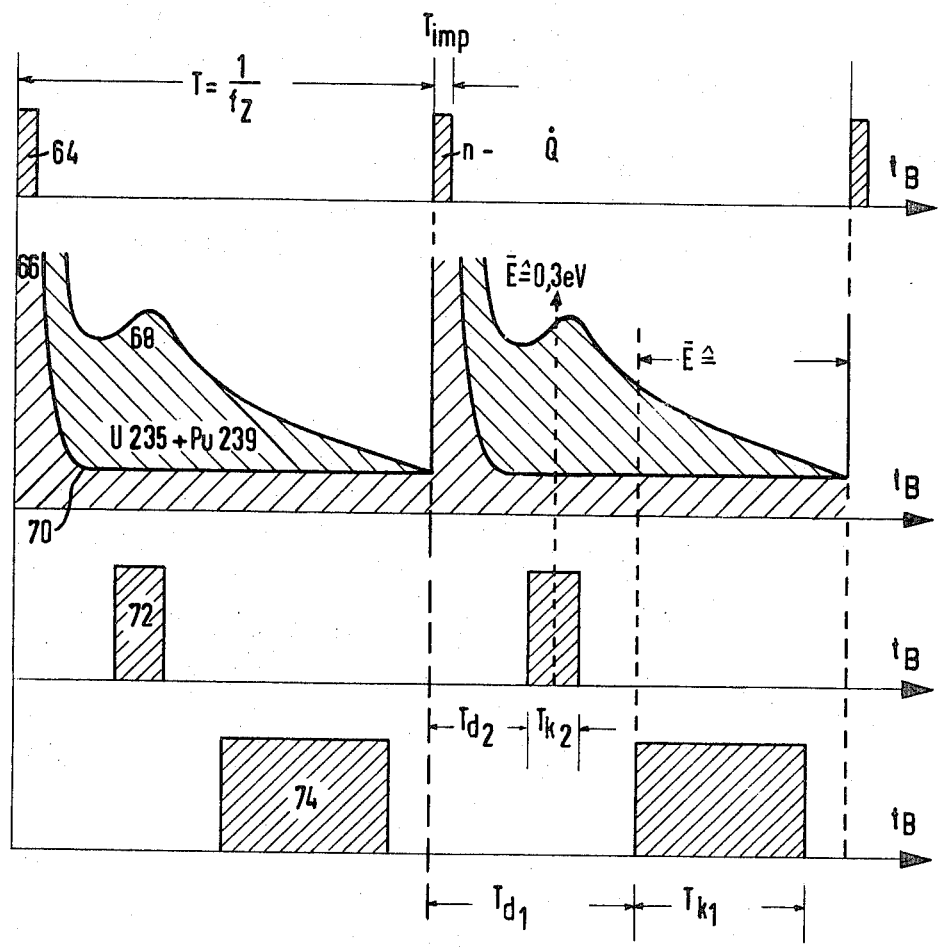
FIG. 2 is a composite plot diagram showing the operation of the device of our invention.

The relationships are shown schematically in the plot diagram of FIG. 2 wherein there is shown above one another as ordinate the pulse 64 of monoenergetic neutrons from the neutron source 18, the course of the counting rates divided into fission neutrons 68 and background radiation 66, the measuring time in a first measuring channel and the measuring time in a second measuring channel. The pulse 64 at 66 first leads to a strong background radiation of fast neutrons which, however, at 70 drops rapidly to a constant value. The surface region indicates the fast neutrons which are produced by nuclear fission of U235 and Pu239, which become effective or are detected by the detectors. It is apparent that a maximum consequently occurs in the region of a mean neutron energy of 0.3 eV which derives from a resonance of the Pu239 in this region. In this region 72, the measurement of the counting rates occurs in a first measuring channel while, in a second measuring channel the measurement of the counting rate in the region of thermal energies 74 occurs.

Figure 3:
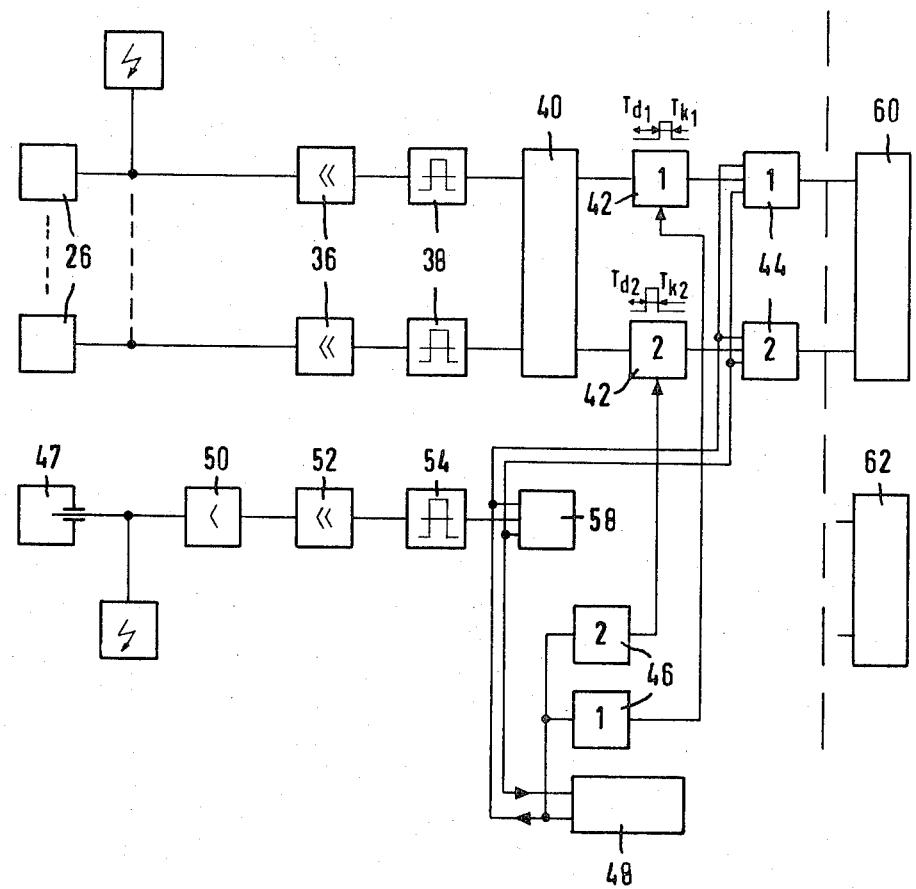
FIG. 3 is a block diagram of the measuring system of the invention.

FIG. 3 shows a block circuit diagram of the measuring apparatus of the invention. The pulses of each recoil proton scintillation counter or detector 26 are conducted through linear amplifier 36 and an integral discriminator 38 to a mixing stage 40. From the mixing stage 40, the pulses of the detectors are added to the measuring channels 24 of one given plane. The integral discriminators 38 are circuits that are well known per se and which, due to the different pulse amplitudes, can differentiate between such pulses which are produced by fission neutrons and such pulses which are induced by gamma quanta. The adjustments at the integral discriminator 38 are selected so that only pulses of fast neutrons reach the mixing stage 40. Both outlets of the mixing stage 40 pass through a respective gate stage 42 to the electronic counters 44. Both gate stages 42 are so controlled as to time by delay generators 46 that they open in accordance with rectangular curves 72 and 74 in FIG. 2, i.e., after a time interval $T_{d_2}$ for a period of time $T_{K_2}$ or after a time interval $T_{d_1}$ for a period of time $T_{k_1}$. The time intervals $T_{d_1}$ and $T_{d_2}$ are thus respectively measured by the production of the fast monoenergetic neutron pulses 64 (FIG. 2).

Since the production of neutron pulses is periodically repeated, the gate stages 42, as indicated in FIG. 3, are controlled by a pushbutton frequency transmitter 48 of the neutron generator 20. When the gate stages are open, the pulses are indicated by the counters 44.

A monitor system formed of a neutron detector 47, a charge or load-sensitive preamplifier 50, a linear amplifier 52, an integral discriminator 54 and a counter 58 registers a pulse count proportional to the product of neutron flux and measuring time.

The counter 58 is a preselection amplifier which, when a specific predetermined pulse count is attained, stops the measuring operation i.e., switches off the neutron generator 20. The monitor system normalizes the measurements to the same neutron flux time. At the end of the measurement, the registered measuring results of the counters 44 are indicated by a printer 60 and is further processed in a suitable manner. Instead of the printer 60, a process computer 62 can be installed which, in addition to the evaluation of the measurement data also assumes the control of the entire measuring operation.

Figure 4:
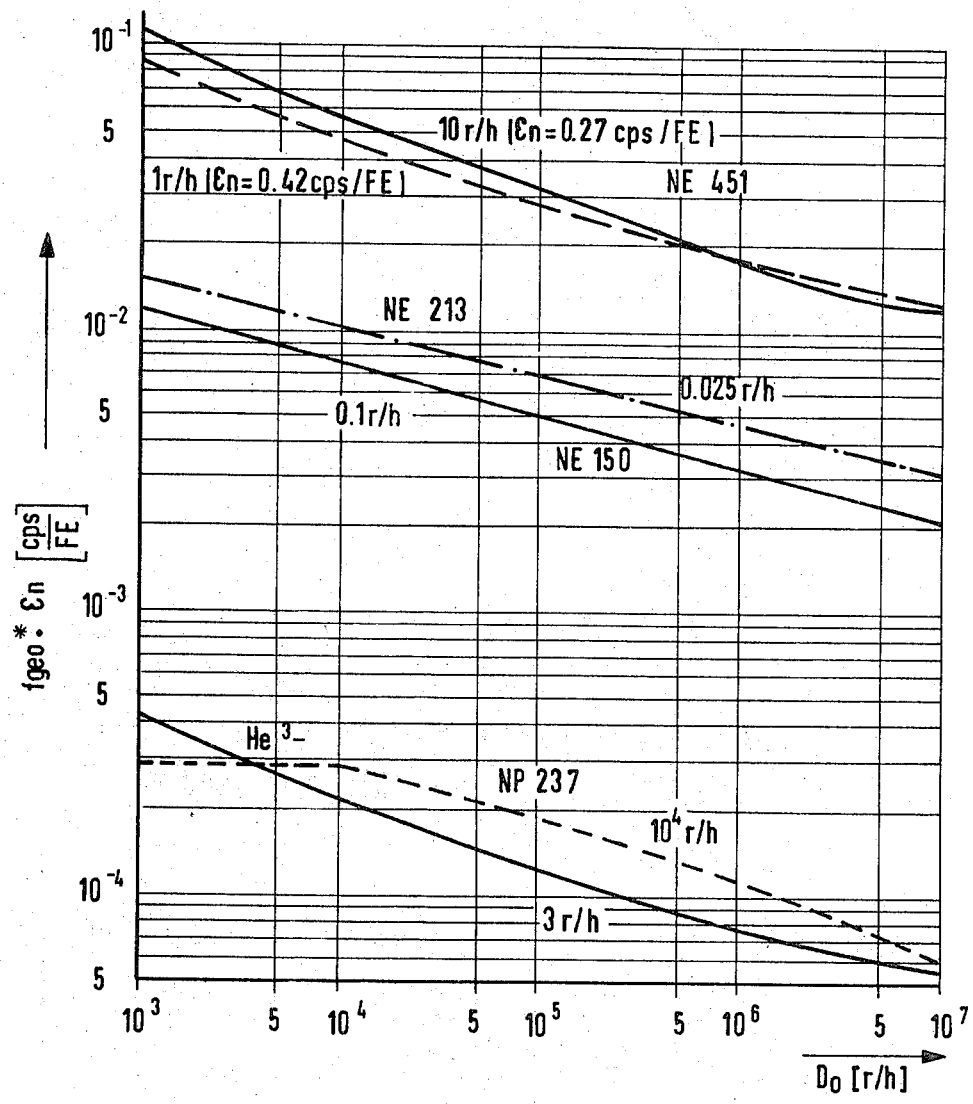
FIG. 4 is a plot diagram providing the basis for selecting the specific neutron detector to be used in the device of our invention.

FIG. 4 shows the selection of the most desirable detector for the purpose at hand.

For the detectors to be used for fast neutrons, the initial requirement is presented for a greatest possible probability of detecting fast neutrons (fission neutron spectrum). The detector, on the other hand, must be insensitive to the thermal and epithermal neutron flux simultaneously present and effecting the fissions. A third criterion for the selection of the detectors derives from the requirement that irradiated fuel elements should also be able to be inspected as to their fissionable material content, which requires a gamma-insensitivity of the detector to relatively high dose outputs. None of the conventional types of detectors for the detection of fast neutrons, preferably, plastic scintillators, He3 counting tubes, fission chambers and so forth fulfill all these requirements simultaneously.

A comparison of these detectors with respect to their utility for the objective which is presented herein must be conducted with respect to the experimentally determined neutron gamma-sensitivities of various plastic scintillators and of a He3 counting tube as well as manufacturing data regarding fission chambers with different electrode installations or coverings. The essential data regarding the detectors are summarized accordingly in the following table.

Detection Probabilities of Different Detectors for Fast (PoBe-) Neutrons ($\epsilon n$) and for Co60-$\gamma$-Radiation ($\epsilon\gamma$)

| Detectors | Production data in the literature $\epsilon n$ cps/FE | Production data determined experimentally | | D$\gamma$max r/h | Remarks |
|---|---|---|---|---|---|
| | | $\epsilon n$ cps/FE | $\epsilon\gamma$ cps/mr/h | | |
| Plastic Scintillators NE 150 (2"dia.×16mm) | 2 | 0.1 | 0.002 | 0.1 | Pulse shape discrimination |
| NE 213 (2"dia.×2") | 2 | 0.2 | 0.008 | 0.025 | Pulse amplitude discrimination |
| NE 451 (2"dia.×16mm) | 0.5 | 0.3 | $10^{-5}$ | 10 | Pulse amplitude discrimination |
| He-3 Counting Tube | $5.10^{-3}$ | $1.5.10^{-3}$ | 0 | ~10 | Pulse amplitude discrimination |
| U238- Fission chamber | $3.4\times10^{-4*}$ | — | 0 | $10^4$ | — |
| Np-237- Fission chamber | $2.9\times10^{-4*}$ | — | 0 | $10^4$ | — |

*Maximum value for commercial fission chamber types.

The dose output D$\gamma_{max}$ is defined as that limiting value above which the gamma-sensitivity of the respective detector sharply increases above the value given in the table due to "pile up."

The table indicates that detectors with good detection probabilities for fast neutrons $\epsilon_n$ also possess high gamma-sensitivity whereas gamma-insensitivity detectors also indicate a poor $\epsilon_n$. With the exception of the fission chambers, all detectors require a lead shielding of about 20 to 25 cm thickness against the test specimen in order to reduce the high gamma-dose output at the surface of irradiated fuel elements to the permissible limiting dose output $D\gamma_{max}$. Since the $\gamma$ decrease in lead is greater in order of magnitude than the neutron decrease, detectors with higher neutron detection probability are thereby more favorable for the described measuring process. That type of detector is sought which for the given surface $\gamma$ activity $D_0$ of the fuel element being inspected affords the highest fission neutron counting rate for the smallest possible background counting rate. For the given fission neutron flux at the surface of the fuel element, the detection probability $\epsilon_n$ multiplies with a geometrical $f_{geo}*$ which gives the reduction of the neutron flux in dependence upon the thickness of the load between the fuel element surface and detector, directly proportional to the fission neutron counting rate. The product $f_{geo}* \cdot \epsilon_n$ is calculated as follows with the aid of known reduction factors for a typical fission product $\gamma$ spectrum in lead and of the measured reduction factor $f_{geo}*$ for fission neutrons in lead with the $\epsilon_n$ values from the preceding table:

For each surface activity $D_0$ that lead thickness is initially determined through which $D_0$ is reduced to the maximum permissible value $D\gamma_{max}$ for the respective detector. The value of $f_{geo}*$ related to this lead thickness $d_{Pb}$ when multiplied with $\epsilon_n$ then provides the sought-after quantity or value. The geometric factor $f_{geo}*$ is dimensionless and thus normalizes to assume the value 1 at the surface of the fuel element. The dependence of the products $f_{geo}* \cdot \epsilon_n$ upon the gamma-dose outputs $D_0$ at the surface of the fuel elements is shown in FIG. 4. At each curve in this diagram, the respective underlying gamma-dose output at the location of the detector is indicated. FIG. 4 shows that, independently of the surface activity of the fuel element, the plastic scintillator NE 451 i.e., a plastic scintillator of the Skarsvag type, which is doped with small amounts of ZnS(Ag), always provides the highest fission neutron counting rate. Both He3 counting tubes as well as fission chambers are more insensitive than all organic scintillators by an order of magnitude. A further advantage of the scintillators is the fact that they barely affect the neutron flux at the location of the fuel element because they must be located, due to their gamma-sensitivity in means that are located 20 – 30 cm away from the fuel element surface.

The scintillator of the Skarsvag type also provides good results with respect to the background counting rate. For the slowing-down time range of the Pu 239 resonance at 0.3eV and for optimum threshold adjustment at the integral discriminator, there is produced, for a pulsed neutron generator (operating with maximum source strength) a background counting rate of 0.2 cps per detector of which 0.05 cps is inapplicable to the natural background counting rate.

In the same energy region, a calibration test produced a fission neutron counting rate of about 20 cps so that for the signal-to-background ratio a value of about 100 was attained.

We claim:

1. Device for non-destructively and separately determining concentrations of fissionable material in a test specimen such as a fuel rod or a fuel element of a nuclear reactor comprising a heavy moderator block formed of lead having a given slowing-down time, said lead moderator block being formed with two channels intersecting substantially in the center of said block, one of said channels being adapted to receive a test specimen therein and the other of said channels being adapted to receive a neutron source therein at the vicinity of the point of intersection of said channels, means for irradiating the test specimen with neutrons, so as to effect nuclear fission producing prompt fission neutrons therein and for producing in said moderator a pulse of monoenergetic fast neutrons of short duration compared to said given slowing-down time of said moderator, and detector means comprising at least one recoil proton counter in the form of a plastic scintillator for determining over various time intervals, in accordance with different mean energies of the irradiating neutrons being slowed down in the moderator, the number of prompt fission neutrons produced in the test specimen.

2. Device according to claim 1, including a layer of lead surrounding said detector means for shielding the same from high gamma radiation of an irradiated test specimen.

3. Device according to claim 1, wherein said plastic scintillator is of the type doped with small amounts of ZnS(Ag).

4. Device according to claim 1, wherein said lead moderator block is a cube.

5. Device according to claim 1, wherein said lead moderator block is cylindrical.

6. Device according to claim 1, wherein a plurality of additional measuring channels are formed in said lead moderator block along the channel wherein a test specimen is receivable and extend substantially perpendicularly to the latter channel, and including at least one detector in each of said additional measuring channels.

7. Device according to claim 6, wherein said detectors of said additional measuring channels are disposed in star-shaped fashion in a plane substantially perpendicularly to said channel wherein a test specimen is receivable, and including means for stepwise sliding a test specimen past said detector.

8. Device according to claim 7, wherein said additional measuring channels and said detectors disposed therein are located in a plurality of parallel planes disposed perpendicularly to said channel wherein a test specimen is receivable.

9. Device according to claim 1, including an integral discriminator for distinguishing the pulses produced by gamma quanta, located in each of said additional measuring channels, and a time-controlled gate stage also located in each of said additional measuring channels, said gate stages, different time intervals and periods, in accordance with a respective pulse of monoenergetic fast neutrons, releasing the pulse travel to a respective counter.

10. Device according to claim 9, including at least one preselection counter responsive to the entire neutron flux of the neutron source, and located on a monitor counting channel provided in said lead block and formed of a detector and one of said gate stages, said preselection counter being closable when a predetermined pulse count is attained.

\* \* \* \* \*